Sept. 12, 1950     C. H. INMAN     2,522,449
POULTRY FEEDING APPARATUS
Filed Nov. 3, 1949
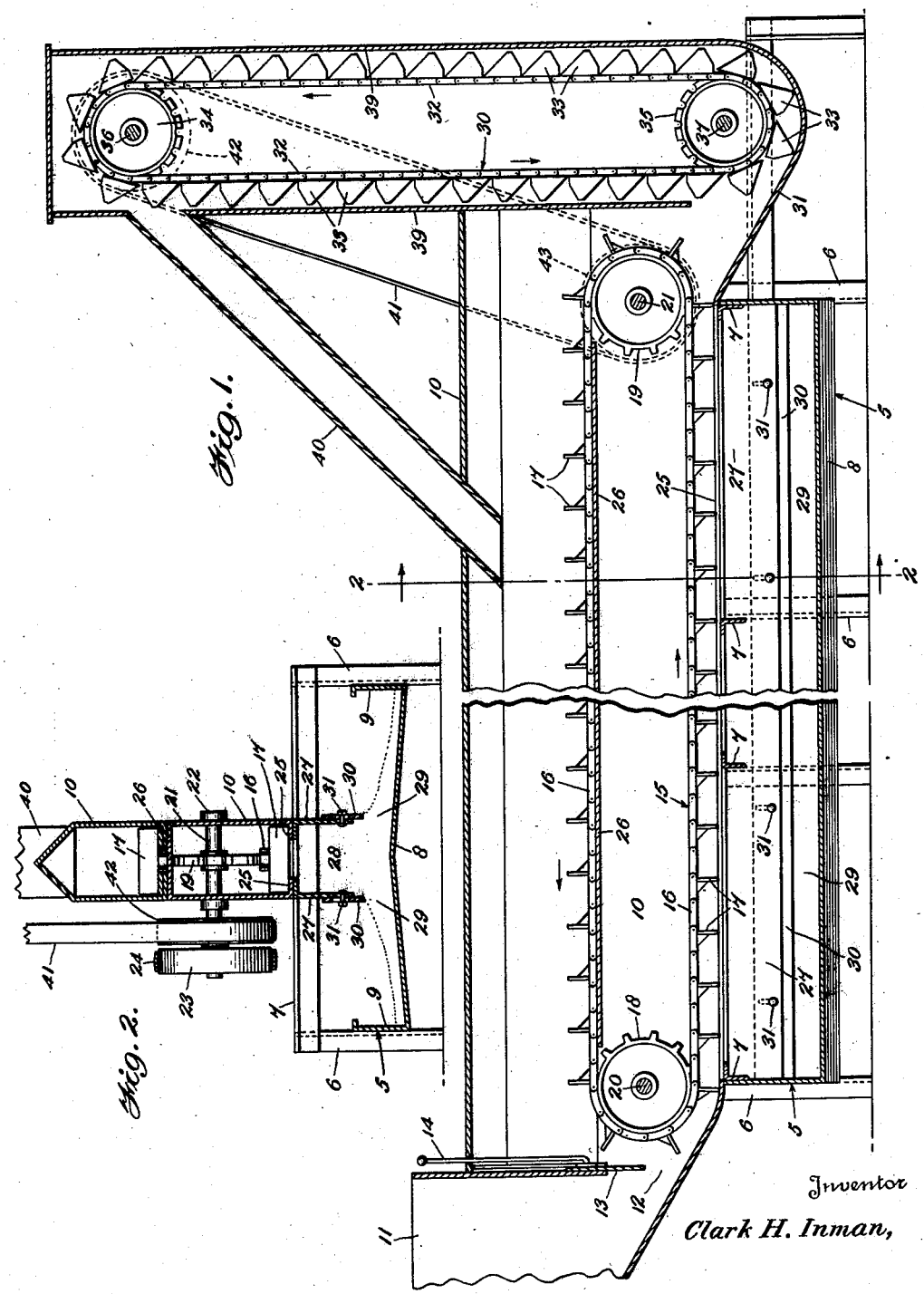
Inventor
Clark H. Inman, Patented Sept. 12, 1950

2,522,449

UNITED STATES PATENT OFFICE 2,522,449

POULTRY FEEDING APPARATUS

Clark H. Inman, Lakewood, N. J.

Application November 3, 1949, Serial No. 125,308

6 Claims. (Cl. 119—51)

The invention relates to feeding apparatus for poultry and the like, and has for its principal object to provide a power driven apparatus suitable for distributing large quantities of feed on commercial poultry farms where thousands of fowls must be fed each day. With the above and other objects in view which will appear as the description proceeds, the invention resides in the novel details of construction and combinations and arrangements of parts more fully hereinafter described and particularly pointed out in the appended claims.

Briefly stated, the apparatus comprises an elongated feed receptacle supported upon a suitable framework and of a length appropriate to any particular installation for which it is intended. At one end of the receptacle there is provided a hopper to which the feed may be supplied in bulk, and extending from the discharge port of said hopper to the other end of the receptacle, above the longitudinal center line of the latter, there is a power driven horizontal endless conveyer of the flight or scraper type. This conveyer is considerably narrower than the receptacle and beneath its lower run a pair of transversely spaced walls depend into the receptacle to provide a throat extending throughout the length of the latter through which the feed moved from the hopper by the conveyer is supplied to the receptacle. The throat walls terminate some distance above the bottom of the receptacle, whereby the feed may spread over said bottom to either side of the throat, and the said walls may be provided with vertically adjustable extensions whereby the distance between the receptacle bottom and the throat walls may be varied to control the amount of feed discharged to the receptacle.

At the end of the receptacle opposite that at which the supply hopper is located, there is provided a power driven vertical conveyer or elevator which is adapted to elevate any surplus feed supplied to the receptacle by the horizontal conveyer and discharge such surplus into a chute or conduit for return to the upper run of the horizontal conveyer whereby it may be returned to the hopper end of the receptacle for redistribution. The horizontal conveyer and the vertical elevator may be driven from any suitable source of power, for example an electric motor or an internal combustion engine.

In the accompanying drawing forming a part of this specification—

Figure 1 is a central longitudinal sectional view, partly broken away, of a typical apparatus constructed and arranged in accordance with the invention; and Fig. 2 is a cross sectional view thereof, on the plane indicated by the line 2—2 in Fig. 1, looking in the direction of the arrows.

In the said drawing the apparatus is shown as comprising an elongated receptacle 5 supported by a framework consisting of uprights 6 and transverse horizontal members 7. The bottom 8 of the said receptacle is preferably crowned or of slightly inverted V-shape in cross section to facilitate spreading of the feed toward each side wall 9, as will appear more fully below.

Supported by the transverse frame members 7 in superposed relation to the longitudinal median portion of the receptacle 5 is an elongated housing 10, at the left hand end of which (as viewed in Fig. 1) there is mounted a supply hopper 11 having a discharge port 12 controlled by a vertically slidable valve plate 13 which may be manually adjusted by a rod 14. Mounted within the housing 10 is an endless conveyer 15 comprising an endless strand of chain 16 carrying transverse flights 17 and trained about sprockets 18 and 19 carried by shafts 20 and 21 journaled in bearings 22 adjacent the respective ends of the housing. The shaft 21 carries a pulley 23 (Fig. 2) engaged by a belt 24 which may be driven from any appropriate source of power, such as an electric motor or an internal combustion engine. The lower portion of the housing 10 is provided with inwardly extending transversely spaced flanges 25 constituting trackways or supports for the end portions of the flights 17 throughout the lower run of the conveyer 15 between the sprockets 18 and 19, and the upper run of the conveyer is supported by a horizontal partition structure 26.

Secured to and extending downwardly from each of the flanges 25 is a plate member 27, constituting the side wall of a throat 28 to which the feed is supplied by the lower run of the conveyer 15. The plates 27 extend throughout the length of the receptacle 5 and depend into the longitudinal medial portion thereof, terminating some distance above its bottom 8 to provide discharge apertures 29, the width of which may be varied by vertically adjustable extension plates 30 secured to the plates 27 by bolt-and-slot connections 31.

The operation of the apparatus as thus far described will be readily understood. With feed having been supplied to the hopper 11 and the conveyer 15 set into motion in the direction indicated by the arrows, upon opening of the valve 13 the feed will discharge through port 12 to the left hand end of the conveyer. The flights 17 of the latter will push successive portions of the feed to the left hand end of the throat 28, through which the feed will fall by gravity to the floor 8 of the receptacle 5, spreading out in opposite lateral directions through apertures 29 to cover the said floor. The depth to which the feed will cover the floor may be regulated by adjustment of the extension plates 30 on the throat walls 27, and when this depth has been reached the feed will back up in the throat 28 to the top thereof. This operation continues until the feed has been distributed throughout the length of the receptacle and the throat 28 has been completely filled.

The driving motor preferably is stopped when filling of the throat is completed. However, mechanism is provided whereby, if for any reason the attendant fails to stop the motor at such time, excess feed will be returned to the supply end of the apparatus. This mechanism comprises a vertical conveyer or elevator 30 mounted adjacent the right hand end of the receptacle 5, with its boot 31 arranged to receive the surplus feed from the conveyer 15. This elevator may be of any appropriate type, being here shown as comprising an endless chain or belt 32 carrying a series of buckets 33 and trained about head and tail sprockets 34 and 35 mounted on shafts 36 and 37 respectively. This mechanism is enclosed by a casing 39 from the upper portion of which an inclined chute or conduit 40 leads downwardly into the upper portion of the horizontal conveyer housing 10. The head shaft 36 of the elevator may be driven by a belt 41 trained about a pulley 42 carried by said shaft, and a pulley 43 carried by the shaft 21 of conveyer 15.

It will be readily understood that any surplus feed carried rightward after the throat 28 has been filled will be discharged into the boot 31 of the elevator 30 where it will be picked up by the buckets 33 thereof and raised to the top of the elevator. As the buckets pass around the head sprocket 34 they will discharge their loads into the conduit 40 through which the feed will pass by gravity into the upper portion of the conveyer housing 10. Here it will be picked up by the upper, leftward traveling run of conveyer 15 and returned to the supply end of the apparatus for redistribution.

As the feed on the floor 8 is removed by the fowls, that in the throat 28 will move downwardly to take its place, thus maintaining a substantially uniform layer upon the receptacle floor until the charge is exhausted. The throat thus acts as a feed reservoir which materially increases the time before a re-filling operation is needed and consequently reduces the attention required to maintain a constant supply of feed for the fowls.

What is claimed is:

1. In apparatus for feeding poultry and the like, the combination of an elongated feed receptacle; transversely spaced wall members disposed in and extending longitudinally of said receptacle in vertically spaced relation to its floor to provide a relatively narrow vertical throat extending throughout the length of the receptacle; power driven conveyer means mounted above the receptacle and traversable longitudinally thereof in proximity to the upper portion of said throat; and means for supplying feed to said conveyer means, for movement thereby into said throat and receptacle.

2. In apparatus for feeding poultry and the like, the combination of an elongated feed receptacle; a pair of transversely spaced vertical wall members disposed in and extending from end to end of the receptacle adjacent its longitudinal center line, said wall members being vertically spaced from the floor of the receptacle and providing a relatively narrow throat above the longitudinal medial portion of said floor; adjustable means for varying the distance between said floor and the lower edges of said wall members, whereby to control discharge of feed from said throat to the receptacle floor; an endless conveyer mounted above the receptacle and having a run traversable longitudinally thereof in proximity to the upper portion of said throat; and a hopper arranged to supply feed to one end of said conveyer for movement thereby into said throat and receptacle.

3. In apparatus for feeding poultry and the like, the combination of an elongated feed receptacle having a transversely sloping floor; a pair of transversely spaced vertical wall members disposed in and extending longitudinally of the receptacle in vertically spaced relation to said floor and providing a relatively narrow throat above the highest portion thereof; vertically adjustable extensions carried by said wall members for varying the distance between the floor and the lower edges of the wall members, whereby to control discharge of feed from said throat to the receptacle floor; power driven conveyer means mounted for movement along the upper portion of said throat; and a hopper arranged to supply feed to said conveyer means for movement thereby into said throat and receptacle.

4. In apparatus for feeding poultry and the like, the combination of an elongated feed receptacle having a floor sloping transversely in opposite directions from a longitudinal center line; a pair of transversely spaced vertical wall members disposed in and extending longitudinally of the receptacle in vertically spaced relation to the longitudinal medial portion thereof to provide a relatively narrow throat above the highest portion of the floor; an endless conveyer mounted above the receptacle, having a horizontal run traversable longitudinally thereof in proximity to the upper portion of said throat; and a hopper having a control valve, arranged to supply feed to one end of said conveyer for movement thereby into said throat and receptacle.

5. In apparatus for feeding poultry and the like, the combination of an elongated feed receptacle; transversely spaced wall members disposed in and extending longitudinally of the receptacle in vertically spaced relation to the floor thereof to provide a relatively narrow vertical throat above said floor; power driven conveyer means movable in proximity to the upper portion of said throat; means at one end of the receptacle for supplying feed to said conveyer means for movement thereby into said throat and receptacle; and a power driven elevating conveyer at the other end of said receptacle arranged to receive surplus feed supplied to the receptacle by the first mentioned conveyer means and return it thereto for redistribution to the throat and receptacle.

6. In apparatus for feeding poultry and the like, the combination of an elongated feed receptacle; transversely spaced wall members extending longitudinally of the receptacle in vertically spaced relation to the floor thereof to provide a relatively narrow vertical throat extending from end to end of the receptacle above said floor; a horizontal endless conveyer mounted above the receptacle and having its lower run traversable longitudinally thereof along the upper portion of said throat; means at one end of the receptacle for supplying feed to said conveyer for movement by said run into the throat and receptacle; an elevating conveyer at the other end of the receptacle for receiving and elevating surplus feed supplied thereto by said horizontal conveyer; and a conduit for returning the elevated surplus feed to the return run of the horizontal conveyer for redistribution to the throat and receptacle.

CLARK H. INMAN.

No references cited.